(12) United States Patent
Puertas Calvo et al.

(10) Patent No.: US 11,283,796 B2
(45) Date of Patent: Mar. 22, 2022

(54) SYSTEMS AND METHODS FOR REAL-TIME DETECTION OF COMPROMISED AUTHENTICATION CREDENTIALS

(71) Applicant: Microsoft Technology Licensing, LLC, Redmond, WA (US)

(72) Inventors: Maria Puertas Calvo, Seattle, WA (US); Lakshmi Priya Gopal, Seattle, WA (US); Laurentiu B. Cristofor, Redmond, WA (US); Pui-Yin Winfred Wong, Redmond, WA (US); Dana S. Kaufman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 244 days.

(21) Appl. No.: 16/581,031

(22) Filed: Sep. 24, 2019

(65) Prior Publication Data
US 2020/0412717 A1  Dec. 31, 2020

Related U.S. Application Data

(60) Provisional application No. 62/866,269, filed on Jun. 25, 2019.

(51) Int. Cl.
*H04L 29/06* (2006.01)

(52) U.S. Cl.
CPC .......... *H04L 63/0876* (2013.01); *H04L 63/10* (2013.01); *H04L 2463/121* (2013.01)

(58) Field of Classification Search
CPC ................. H04L 63/0876; H04L 63/10; H04L 2463/121; H04L 63/20; G06F 21/30; G06F 21/577

USPC ........................................................ 726/4
See application file for complete search history.

(56) References Cited

U.S. PATENT DOCUMENTS

| | | | |
|---|---|---|---|
| 2014/0189829 A1* | 7/2014 | McLachlan | H04L 63/08 726/6 |
| 2015/0339477 A1 | 11/2015 | Abrams et al. | |
| 2018/0026983 A1 | 1/2018 | Jain et al. | |
| 2018/0069867 A1* | 3/2018 | Grajek | H04W 12/062 |

OTHER PUBLICATIONS

"International Search Report and Written Opinion Issued in PCT Application No. PCT/US2020/031244", dated Aug. 28, 2020, 14 Pages.

* cited by examiner

*Primary Examiner* — Longbit Chai
(74) *Attorney, Agent, or Firm* — Fiala & Weaver P.L.L.C.

(57) ABSTRACT

Methods, systems, and computer program products are provided for real-time compromise detection based on behavioral analytics. The detection runs in real-time, during user authentication, for example, with respect to a resource. The probability that the authentication is coming from a compromised account is assessed. The features of the current authentication are compared with the features from past authentications of the user. After comparison, a match score is generated. The match score is indicative of the similarity of the authentication to the user's history of authentication. This score is then discretized into risk levels based on the empirical probability of compromise based on known past compromised user authentications. The risk levels may be used to detect whether user authentication is occurring via compromised credentials.

20 Claims, 6 Drawing Sheets

SYSTEMS AND METHODS FOR REAL-TIME DETECTION OF COMPROMISED AUTHENTICATION CREDENTIALS

CROSS-REFERENCE TO RELATED APPLICATIONS

This application claims priority to U.S. Provisional Patent Application No. 62/866,269, filed Jun. 25, 2019, the entirety of which is incorporated by reference herein.

BACKGROUND

Offline detection of compromised authentication credentials is not performed fast enough. Studies have shown that the mean time to identify a computer breach is 197 days. An attacker (e.g., a hacker using a computer to gain unauthorized access to data) can do a lot of harm to a computer system in just a few minutes. The average time it takes an attacker to move laterally (e.g., to further computer systems) within a compromised network is about 2 hours. The sooner the attacker can be stopped, the better.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for real-time compromise detection based on behavioral analytics. The detection runs in real-time, during user authentication, for example, with respect to a resource. The probability that the authentication is coming from a compromised account is assessed. The features of the current authentication are compared with the features from past authentications of the user.

After comparison, a match score is generated. The match score is indicative of the similarity of the authentication to the user's history of authentication. This score is then discretized into risk levels based on the probability of compromise based on known past compromised user authentications. The risk levels may be used to detect whether user authentication is occurring via compromised credentials.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
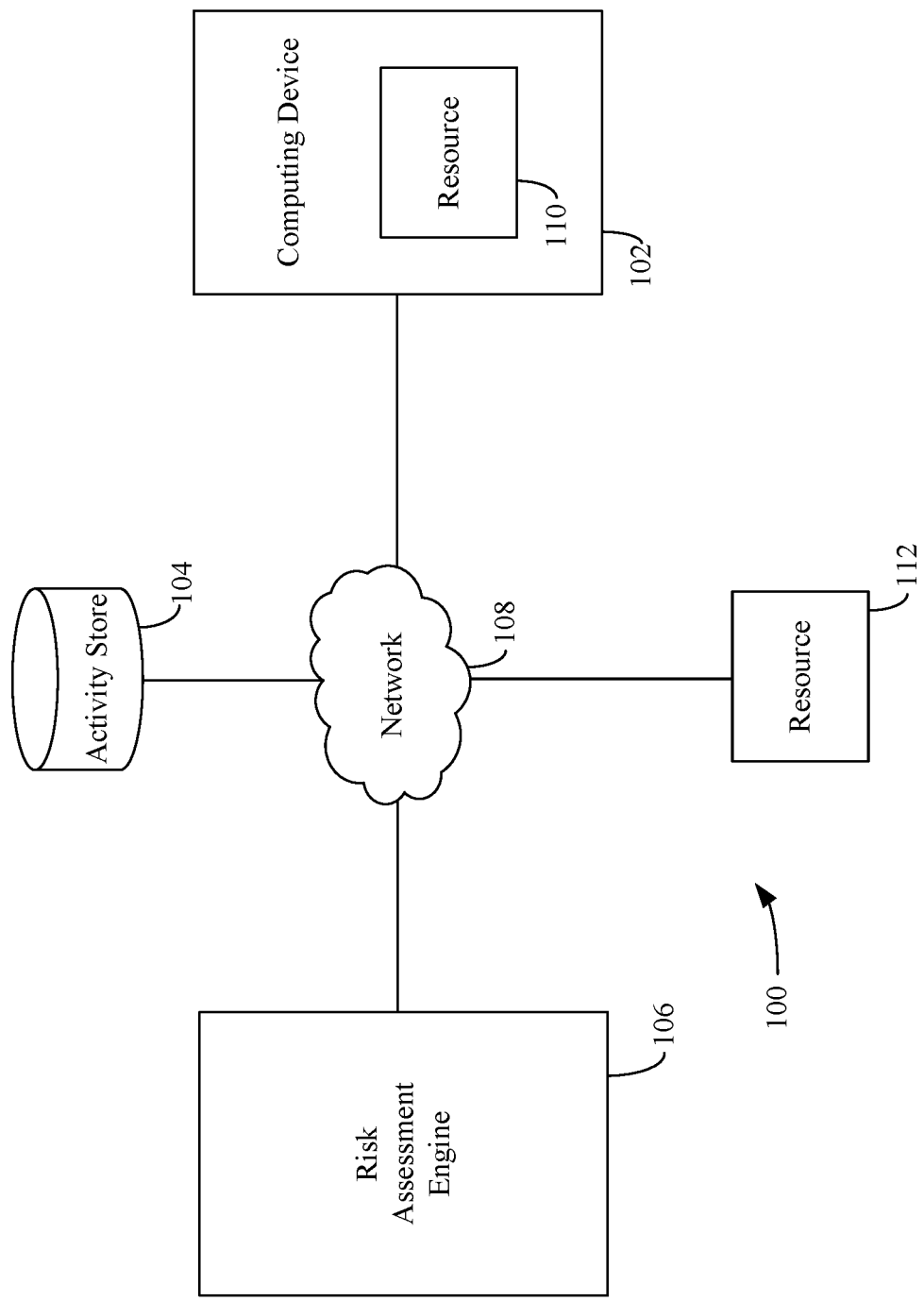
FIG. 1 shows a block diagram of a system for the real-time detection of compromised authentication credentials, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

It is further noted that the usage of the term "greater than" (and/or symbols representative thereof) may correspond to "greater than or equal to" (and vice versa), and the usage of term "less than" (and/or symbols representative thereof) may correspond to "less than or equal to" (and vice versa).

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to real-time compromise detection based on behavioral analytics. The detection runs in real-time, during user authentication, for example, with respect to a resource. The probability that the authentication is coming from a compromised account is assessed. The features of the current authentication are compared with the features from past authentications of the user. After comparison, a match score is generated. The match score is indicative of the similarity of the authentication to the user's history of authentication. This score is then discretized into risk levels based on the empirical probability of compromise based on known, past compromised user authentications. The risk levels may be used to detect whether user authentication is occurring via compromised credentials.

The embodiments described herein provide advantages. For instance, the techniques described herein advantageously mitigate unauthorized accesses to resources (e.g., applications, web sites, user accounts, etc.), thereby protecting personal and/or confidential information associated with the resource, as well preventing access to the network on which the resource is provided. Moreover, a risk score of an authentication is determined, rather than a simple binary decision of risk/no-risk. This advantageously enables users with different risk tolerance to make more granular decisions regarding how they want the system to behave based on the risk level. Furthermore, the risk levels are associated to compromise probability based on empirical observations of past compromised authentications. Moreover, not only are authentication-related features analyzed, but frequency and recency patterns of the features are utilized to assign different weights to the features. This advantageously enhances the behavioral tracking for the users. Still further, the techniques described herein also take into consideration the distance to the closest familiar location of authentication when determining the match score.

Such embodiments may be implemented in various ways. For instance, FIG. 1 shows a block diagram of a system 100 for the real-time detection of compromised authentication credentials, according to an example embodiment. As shown in FIG. 1, system 100 includes a computing device 102, an activity store 104, a risk assessment engine 106, and a resource 112. As further shown in FIG. 1, computing device 102 may be configured to store and/or execute a resource 110. System 100 is described in detail as follows.

Computing device 102 may be configured to access and/or utilize resources remotely located thereto, such as resource 112. Each of resource 110 and resource 112 may require authentication credentials before a user is enabled to use and/or access resource 110 and resource 112. Examples of resource 110 and resource 112 include, but are not limited to, a software application, a web service, an email client, a website that provides access to a user account (e.g., for a personal banking account, a social media service, an e-mail service, a gaming account, etc.), etc. Examples of authentication credentials include, but are not limited to, a username and/or password, a PIN, an authentication token, etc.

Computing device 102 may be any type of stationary computing device, including a desktop computer, a server, etc. or a mobile computing device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), or other browser-enabled device. Risk assessment engine 106 may be implemented in a computing device (e.g., computing device 102), a server located on-premises, a server located in a cloud-based computing environment, etc.

Computing device 102, activity store 104, risk assessment engine 106, and resource 112 are communicatively coupled to each other via network 108. Network 108 may comprise one or more networks such as local area networks (LANs), wide area networks (WANs), enterprise networks, the Internet, etc., and may include one or more of wired and/or wireless portions.

Risk assessment engine 106 is configured to perform several functions. For example, risk assessment engine 106 may be configured to perform behavior tracking, where certain authentication-related features and/or characteristics of a plurality of users are tracked. Such characteristics may be stored in activity store 104. Activity store 104 may store an entry for each user being tracked. Each entry of a user may comprise a list of authentication features associated with the user. Examples of authentication features include, but are not limited to, IP-related features (e.g., an IP address utilized during an authentication process, an autonomous system number (ASN), which indicates the organization that owns the IP, a location (e.g., a latitude/longitude pair) that indicates the geographical location of the IP address, etc.), a device identifier for a device utilized during the authentication process, a tenant IP subnet associated with the authentication process (e.g., a calculated feature where/24 IP subnets are associated to the user's tenant as likely being corporate IPs), a browser ID of a browser utilized during an authentication process (e.g., an identifier for a persistent cookie stored in the user's device by the browser), etc. It is noted that the authentication features described herein are purely exemplary and that other features may also be utilized.

For each of the features stored in activity store 104, the following information is stored: the number of times the user has authenticated with the feature, the frequency the user has authenticated with that feature, the standard deviation of the frequency the user has authenticated with the feature, and the timestamp of the last time the user authenticated with last feature. The count, frequency, standard deviation and timestamp for each feature may be periodically recomputed and stored in activity store 104.

Risk assessment engine 106 may be further configured to perform feature matching. Every time a user authenticates successfully with a resource (e.g., resource 110 and/or 112), the features of the authentication are extracted and compared to the user's features stored in activity store 104. For example, the IP address used during the authentication is compared to all the IP addresses associated with the user that are stored in activity store 104. If the feature is found in activity store 104, a match pattern is computed. The match pattern for the feature may be based on an analysis of the count, frequency, standard deviation and last seen timestamp that are stored for that feature in activity store 104. Based on this analysis, a feature match can be considered frequent active, frequent inactive, occasional active, occasional inactive or rare. A match pattern of frequent active for a particular feature means that the user frequently authenticates and has recently authenticated with that feature. A match pattern of frequent inactive for a particular feature means that the user frequently authenticates and has not recently authenticated with that feature. A match pattern of occasional active for a particular feature means that the user occasionally authenticates and has recently authenticated with that feature. A match pattern of occasional inactive for a particular feature means that the user occasionally authenticates and has not recently authenticated with that feature. A match pattern of rare means that the user rarely has authenticated with that feature. It is noted that other match patterns may also be utilized.

If the authentication feature does not match any of the features stored in activity store 104 for that feature type, the feature is considered a no-match. When a feature does not match any of the entries in activity store 104, the best-known match pattern for that feature type is retrieved from activity store 104. This may be performed by calculating the patterns of all the saved features in activity store 104 using the match pattern analysis and retrieving the top one based on the following order: frequent active, frequent inactive, occasional active, occasional inactive, rare.

The match patterns may be determined in accordance with the following Equations, in an embodiment:

Frequent=countIntervals>threshold1 AND
    averageIntervalSize<threshold2 (many and frequent)    (Equation 1)

Rare=countIntervals<threshold3 OR
    averageIntervalSize>threshold4 (few OR far apart)    (Equation 2)

Occasional=(countIntervals>threshold3 AND
    countIntervals<threshold1) OR
    (averageIntervalSize>threshold2 AND
    averageIntervalSize<threshold4)    (Equation 3)

Inactive=time since last seen−
    averageIntervalSize>standardDeviation*factor    (Equation 4)

where countIntervals represent the number of times a particular feature was utilized and averageIntervalSize represents the average time between the particular feature being utilized (e.g., across different days). In accordance with an embodiment, threshold1, threshold2, threshold3, threshold4, and factor are predetermined values. In other embodiments, the match patterns may be determined in other ways, including according to other algorithms, as would become apparent to persons skilled in the relevant art(s) from the teachings herein.

The match patterns and no-match patterns that are determined for each feature utilized in the authentication process may then be used to determine a match score. The match score may be determined by assigning different weights to each feature of the authentication based on the feature type strength and the feature match or no-match pattern. Feature type strength may be a weight that is assigned based on how unique the feature type is to individual users. For example, a device is more unique to users than geographical location. The weights assigned to the match pattern are based on how strong the match is (e.g., a frequent match has more weight than an occasional match). For features that do not match, the best-known match pattern weights are negative. The no-match weights are reflective of how much is known about the user. If a user's best-known pattern for a feature is just occasional inactive, less weight may be subtracted from the match score than if the best-known pattern is frequent active due to there being less confidence of the no-match being malicious, given that not enough is known about the actual user's behavior.

If the location doesn't match the user's locations in activity store 104, risk assessment engine 106 may determine the authentication's location distance to the closest known geographical location for the user. The negative weight assigned to the no-match may be proportional to this calculated distance.

In accordance with an embodiment, the match score is determined in accordance with Equation 5, which is shown below:

$$S=\Sigma_{i=1}^{I} f_i \qquad \text{(Equation 5)}$$

where $f_i$ is the contribution for each tracked feature. In more clear terms, the match score may correspond to the following addition: MatchScore=the IP features match score (IPFeaturesMatchScore)+ the device match score (DeviceIDMatchScore)+ the browser match score (BrowserMatchScore)+ the tenant subnet match score (TenantSubnetMatchScore).

The IP features match score is based on all the IP-related features. Because the IP based features are all tied to the IP address, they are treated as members of the same set. They also have certain interdependencies: for example, if the IP matches, so do the location and the ASN. However, if the IP doesn't match, the location and the ASN can still match. Also, the location can be considered a match when the distance to the closest familiar location is under a particular distance. However, when it doesn't match, the distance between the location and the closest familiar location can be quantified and treated differently depending on the distance.

The IP features match score may be calculated in accordance with the following Equations:

```
IPFeaturesMatchScore=
    IF (IP matches) THEN
        IPMatchScore
    ELSE
        LocationMatchScore+ASNMatchScore    (Equation 6)
where IPMatchScore = IPMatchWeight * IPMatchPatternTypeWeight
ASNMatchScore =
    IF ASN Matches
        ASNMatchWeight*ASNMatchPatternTypeWeight
    ELSE
        ASNNoMatchWeight*ASNBestKnownPatternTypeWeight
                                            (Equation 7)
LocationMatchScore =
    IF (DistanceToClosestFamiliarLocation<X km) THEN
        LocationMatchWeight*LocationMatchPatternTypeWeight
    ELSE
        LocationNoMatchWeightForDistance*
        LocationBestKnownPatternTypeWeight    (Equation 8)
``` where X is can be any positive integer. In other embodiments, the IP features match score may be determined in other ways, including according to other algorithms, as would become apparent to persons skilled in the relevant art(s) from the teachings herein.

The device identifier match score adds a lot of value because it indicates that the user has signed-in from a familiar registered device, which is a strong indicator of legitimacy in the session. However, this data point is not always available, for example, for legacy authentication calls, or for some flows even when the device is familiar Due to these limitations, this match type has a high positive weight for matches, but no negative weight for no matches. According to an example embodiment, the device match score may be determined in accordance with Equation 9, which is shown below:

$$\begin{aligned}&\text{DeviceIDMatchScore} = \\ &\quad \text{IF (DeviceID matches)} \\ &\quad\quad \text{DeviceIDMatchWeight* DeviceIDMatchPatternTypeWeight} \\ &\quad \text{ELSE} \\ &\quad\quad 0 \quad\quad\quad\quad\quad\quad\quad\quad\quad\quad\quad\quad \text{(Equation 9)}\end{aligned}$$

Similar to the device, the Browser ID is a unique device identifier for browser logins, but it doesn't appear in all sign-ins, as it's restricted to modern browser authentications. The Browser ID for a device can change often due to many reasons, so it's not as stable and trusted as the device ID. Similar to the device match score, it has a high positive weight, but no negative weight for no matches. In an embodiment, the browser ID match score may be determined in accordance with Equation 10, which is shown below:

$$\begin{aligned}&\text{BrowserIdMatchScore} = \\ &\quad \text{IF (BrowserId matches)} \\ &\quad\quad \text{BrowserIdMatchWeight* BrowserIdMatchPatternTypeWeight} \\ &\quad \text{ELSE} \\ &\quad\quad 0 \quad\quad\quad\quad\quad\quad\quad\quad\quad\quad\quad\quad \text{(Equation 10)}\end{aligned}$$

The tenant subnet match may be rare, but also a very strong indicator of a good user login. The tenant subnets may be determined with a high degree of certainty that the network is only being used by the legitimate tenant users. For this reason, the weight for tenant subnet is very high for matches, and zero for no matches. In an embodiment, the tenant subnet match score may be determined in accordance with Equation 12, which is shown below:

$$\begin{aligned}&\text{TenantSubnetMatchScore} = \\ &\quad \text{IF (TenantSubnet matches)} \\ &\quad\quad \text{TenantSubnetMatchWeight} \\ &\quad \text{ELSE} \\ &\quad\quad 0 \quad\quad\quad\quad\quad\quad\quad\quad\quad\quad\quad\quad \text{(Equation 11)}\end{aligned}$$

Techniques for determining a tenant subnet match are described below. Tenant subnet matching may be utilized in cloud-based environments, in which a customer (or tenant) utilizes the services of a cloud-based provider. Often times, a tenant is a corporation. In these cases, the goal of tenant subnet matching is to determine corporate IP networks (e.g., based on the sign-in activity observed from users that authenticate via the cloud-based environment). By aggregating the sign-in data, IP addresses that primarily send traffic just for users from a specific tenant may be determined, thereby concluding that the IP network belongs to the tenant.

This information may be utilized to enhance behavioral compromise detection. If a user signs-in and the sign-in features don't match the user's past activity, but it is determined that the IP address is likely to be from the user's corporate network, the risk assigned to authentication may be reduced, thereby increasing the precision of the detection.

In accordance with an embodiment, the foregoing may be achieved as follows: On a daily basis, the last 24 hours of sign-in telemetry may be queried. An entry per user per IP subnet may be determined, which comprises the date, tenant ID (also referred to as a Directory ID or Organization ID), user ID, client IP subnet, IP frequency pattern, and result of log-ins/sign-ins. This data may be stored in activity store 104. This information may be queried on a daily basis for the date in the latest 7 days. The IP subnet/tenant pairs may be aggregated and filtered.

In accordance with an embodiment, the IP subnet/tenant pairs may be aggregated and/or filtered based on historical information. The historical information may include the percentage of traffic in the IP subnet that belongs to the tenant, the percentage of rate of success of sign-ins in the subnet for the tenant, the total amount of users from the tenant that signed in from the subnet, the number of days some tenant's traffic has come from the subnet, the average daily rate of success of sign-ins from the tenant, the percentage of risky logins in the subnet.

Every tenant/IP-subnet pair that has some or all of the above conditions is considered a match pair, and therefore that the IP subnet belongs to the tenant's corporate IP. The matching IP-tenant pairs may be outputted to a file that is uploaded to a data store (e.g., activity store 104, an IP cache, etc.). This information is retrieved at sign-in time, so for every sign-in, risk assessment engine 106 determines whether the IP address belongs to the tenant corporate network or not.

Risk assessment engine 106 may be further configured to determine the risk of the authentication based on the match score. For instance, the probability of account compromise is evaluated at different values of the match score. This may be performed based on empirical data collected from known compromised authentications. Once the probability of compromise is determined for every match score, thresholds may be set for detection. For example, a low risk threshold, a medium risk threshold, and a high-risk threshold may be set. The low risk threshold may represent the probability of compromise at that score range is low. The medium risk threshold may represent the probability of compromise at that score range is medium. The high-risk threshold may represent the probability of compromise at that score range is high. The thresholds may be set based on the match scores determined for the distribution of users. When an authentication process occurs with respect to a resource (e.g., resource 110 and/or 112), risk assessment engine 106 determines the match score and compares it the various risk level thresholds. Risk assessment engine 106 may perform an action based on which threshold is reached. For example, if the match score corresponds to a high-risk level threshold, then risk assessment engine 106 may block the authentication, thereby preventing the malicious user from logging in. If the match score corresponds to a medium risk level, risk assessment engine 106 may prompt the user for another factor (e.g., risk assessment engine 106 may require multi-factor authentication in order to authenticate the user). If the match score corresponds to a low risk level, risk assessment engine 106 may authenticate the user and provide access to resource 110 and/or 112. It is noted that the actions performed above are purely exemplary and that other actions may be performed based on the determined risk level of the authentication. It is further noted that the actions may be configurable by a user (e.g., an admin, an end user, etc.).

Figure 2:
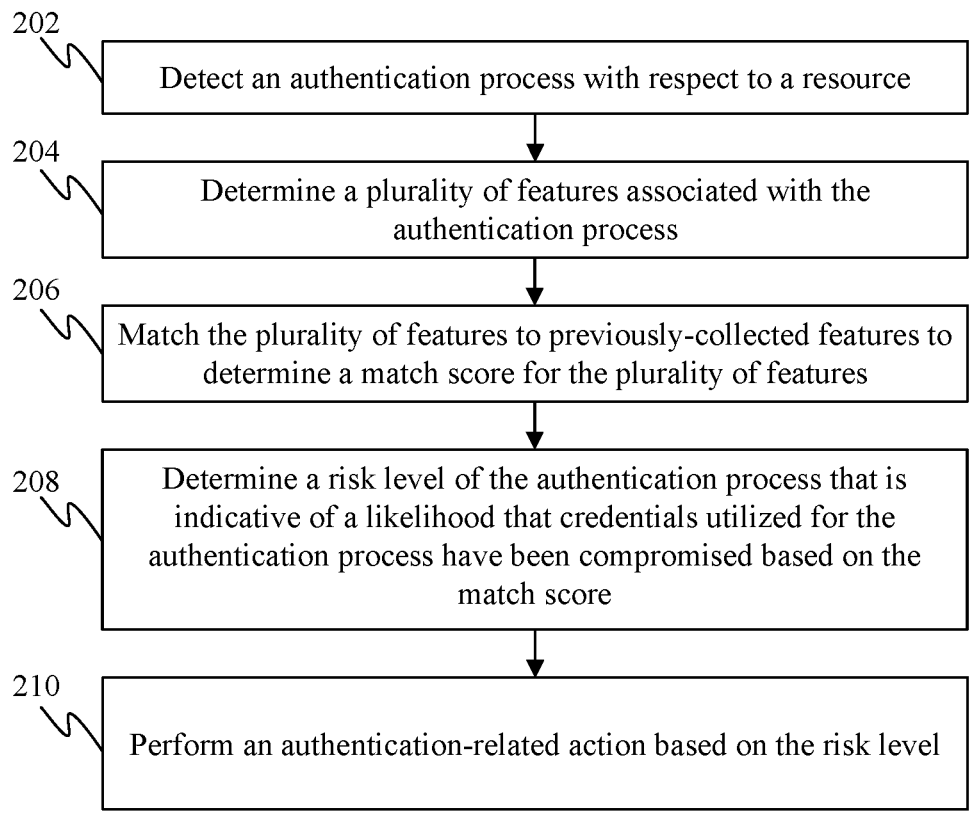
FIG. 2 shows a flowchart of a method for real-time detection of compromised authentication credentials, according to an example embodiment.
Figure 3:
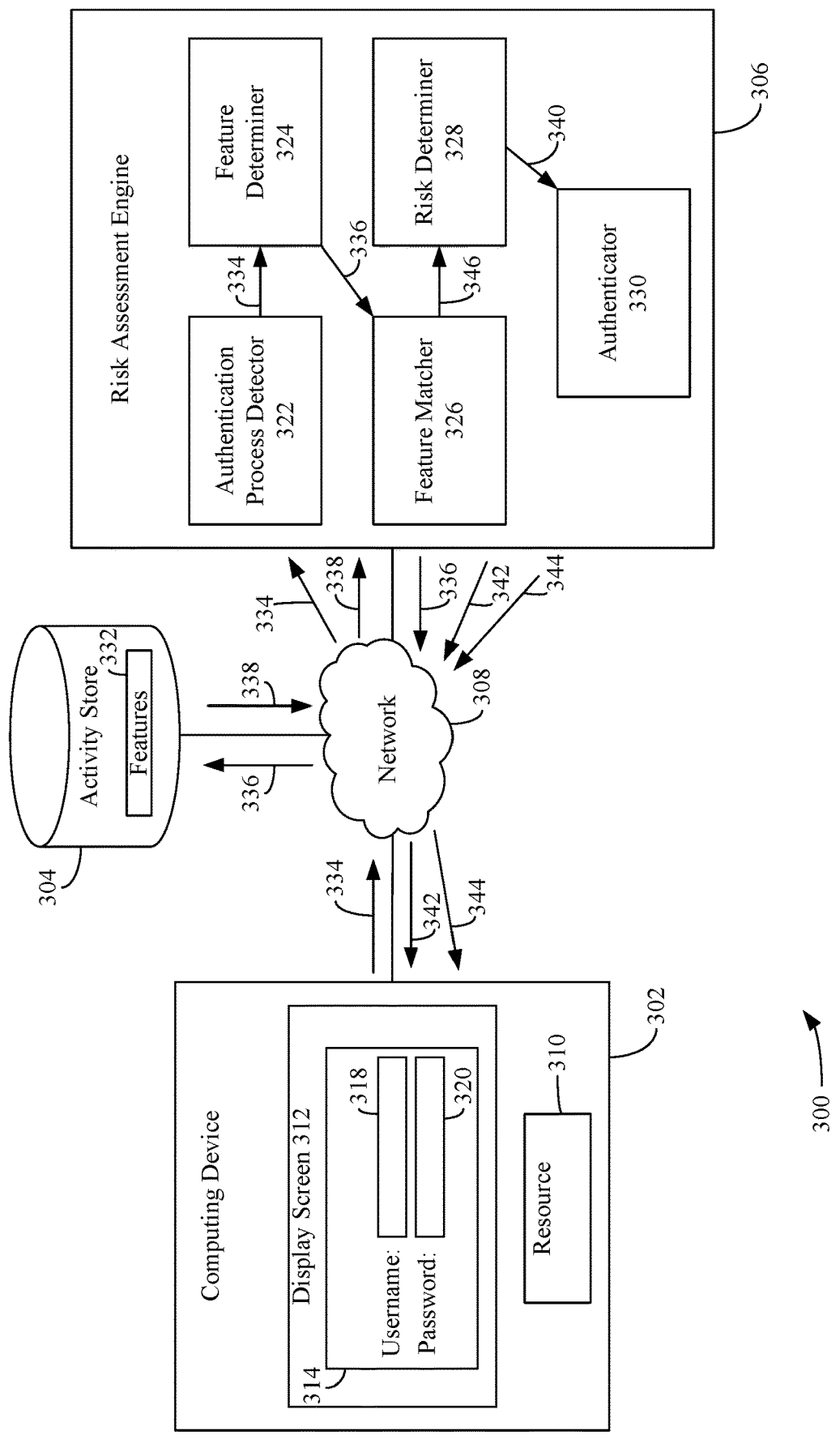
FIG. 3 shows a block diagram of a system for real-time detection of compromised authentication credentials, including an example risk assessment engine implementation, according to another example embodiment.

Accordingly, compromised authentication credentials may be detected in real time in many ways. FIG. 2 shows a flowchart 200 of a method for real-time detection of compromised authentication credentials, according to an example embodiment. In an embodiment, flowchart 200 may be implemented by a risk management engine 306, as shown in FIG. 3. FIG. 3 is a block diagram of a system 300 for real-time detection of compromised authentication credentials, according to an example embodiment. As shown in FIG. 3, system 300 includes a computing device 302, an activity store 304, and risk assessment engine 306, which are communicatively coupled via a network 308. Computing device 302, activity store 304, risk assessment engine 306, and network 308 are examples of computing device 102, activity store 104, risk assessment engine 106, and network 108, as respectively described above with reference to FIG. 1. As also shown in FIG. 3, computing device 302 comprises a display screen 314 and a resource 310. Resource 310 is an example of resource 110, as described above with reference to FIG. 1. As further shown in FIG. 3, risk assessment engine 306 comprises an authentication process detector 322, a feature determiner 324, a feature matcher 326, a risk determiner 328, and an authenticator 330. Other structural and operational embodiments will be apparent to persons skilled in the relevant art(s) based on the following discussion regarding flowchart 200 and system 300 of FIG. 3.

Flowchart 300 of FIG. 3 begins with step 302. In step 302, an authentication process with respect to a resource is detected. For instance, as shown in FIG. 3, a user may be prompted to enter user credentials for authentication with respect to resource 310. The user may be prompted via a display window 314 shown via display screen 312. In an embodiment in which resource 310 is remotely-located from computing device 302 (e.g., resource 112), display window 314 may be a browser window that displays a web page that enables a user to provide user credentials. A user may be enabled to enter a first user credential (e.g., a user name) via a first text box 318 and may be enabled to enter a second user credential (e.g., a password) via a second text box 320. It is noted that the user credentials may comprise other information in addition to and/or in lieu of a username and password. For example, user credentials may also comprise a PIN, an authentication token, etc. Upon submitting user credentials, resource 310 may provide an indication 334 to risk assessment engine 306 via network 308. Authentication process detector 322 of risk assessment engine 306 may detect that an authentication process with respect to resource 310 is occurring based on receiving indication 334.

In step 304, a plurality of features associated with the authentication process are determined. For example, with reference to FIG. 3, feature determiner 324 may be configured to determine the plurality of features associated with the authentication process. For instance, authentication processes detector 322 may provide indication 334 to feature determiner 324. Indication 334 may specify the user credentials and/or the plurality of features associated the authentication process with respect to resource 310. Feature determiner 324 may analyze indication 334 and extract features 336 therefrom. Features 336 may be provided to feature matcher 326.

In accordance with one or more embodiments, the features comprise at least one of an IP address utilized during the authentication process, a device utilized for the authentication process, a tenant IP subnet associated with the authentication process, a browser identifier of a browser utilized during the authentication process, an ASN associated with the authentication process, or a location from which the authentication process was initiated. For example, with reference to FIG. 3, indication 334 may specify an IP address utilized during the authentication process (e.g., the IP address of computing device 302), a device utilized for the authentication process (e.g., computing device 302), a tenant IP subnet associated with the authentication process, a browser identifier of a browser utilized during the authentication process (e.g., display window 314), an ASN associated with the authentication process, or a location from which the authentication process was initiated.

In step 306, the plurality of features is matched to previously-collected features to determine a match score for the plurality of features. For example, with reference to FIG. 3, activity store 304 may store previously-collected features 332. Features 332 may comprise features that have been collected for a particular user over time via a plurality of authentications performed with respect to the user and a particular resource (e.g., resource 310). Feature matcher 326 may retrieve features 332 via a query 336 provided to activity store 304 via network 308. For example, query 336 may specify the username and/or an identifier for resource 310. Activity store 304 may provide a response 338 that includes features 332 that have been previously collected with respect to the user and/or the resource. Feature matcher 326 may match the plurality of features (received via indication 334) to previously-collected features 332 (received via response 338) to determine a match score 346 for the plurality of features. Match score 346 may be provided to risk determiner 328. Additional example detail regarding match score determination is described below with reference to FIGS. 4 and 5.

In step 208, a risk level of the authentication process that is indicative of a likelihood that credentials utilized for the authentication process have been compromised is determined based on the match score. For example, with reference to FIG. 3, risk determiner 328 determines a risk level 340 of the authentication process that is indicative of a likelihood that credentials utilized for the authentication process have been compromised based on match score 346. For example, if match score 346 is relatively high, then risk level 340 may be set to a relatively low risk level. If match score 346 is relatively low, then risk level 340 may be set to a relatively high risk level.

In step 210, an authentication-related action is performed based on the risk level. For example, with reference to FIG. 3, authenticator 330 performs an authentication-related action based on risk level 340.

In accordance with one or more embodiments, access is prevented to the resource responsive to the determined risk level being a relatively high risk level. For example, with reference to FIG. 3, authenticator 330 may prevent access to resource 310 responsive to determined risk level 340 being a relatively high risk level. For instance, authenticator 330 may provide a control signal 342 to resource 310 via network 308 that causes resource 310 to reject the user credentials, thereby preventing access to resource 310.

In accordance with one or more embodiments, access is granted to the resource responsive to the determined risk level being a relatively low risk level. For example, with reference to FIG. 3, authenticator 330 may grant access to resource 310 responsive to determined risk level 340 being a relatively low risk level. For instance, authenticator 330 may provide a control signal 344 to resource 310 via network 308 that causes resource 310 to accept the user credentials, thereby granting access to resource 310.

Figure 4:
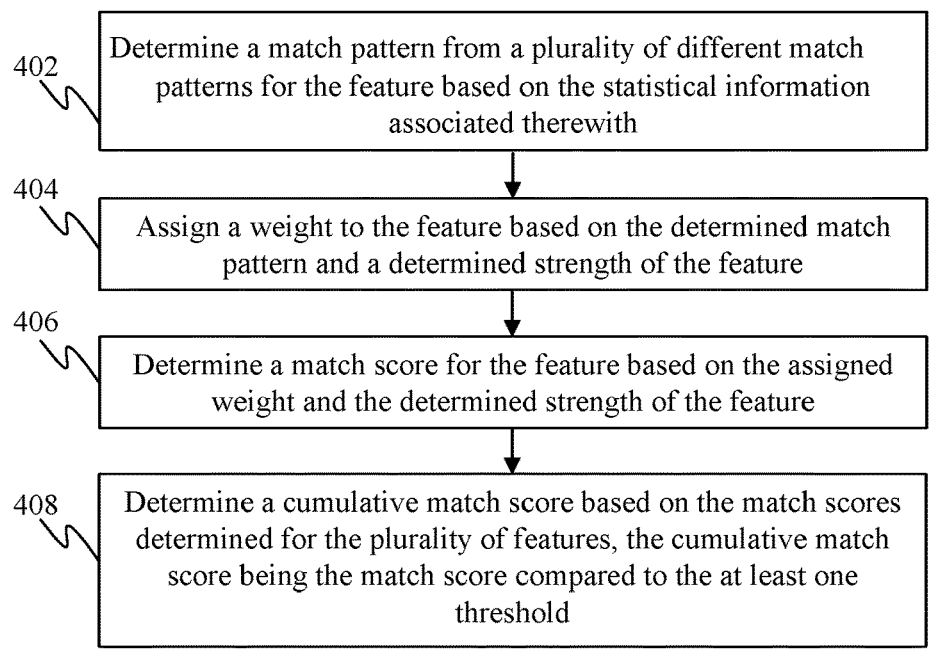
FIG. 4 shows a flowchart of a method for determining a match score for a plurality of features, according to an example embodiment.
Figure 5:
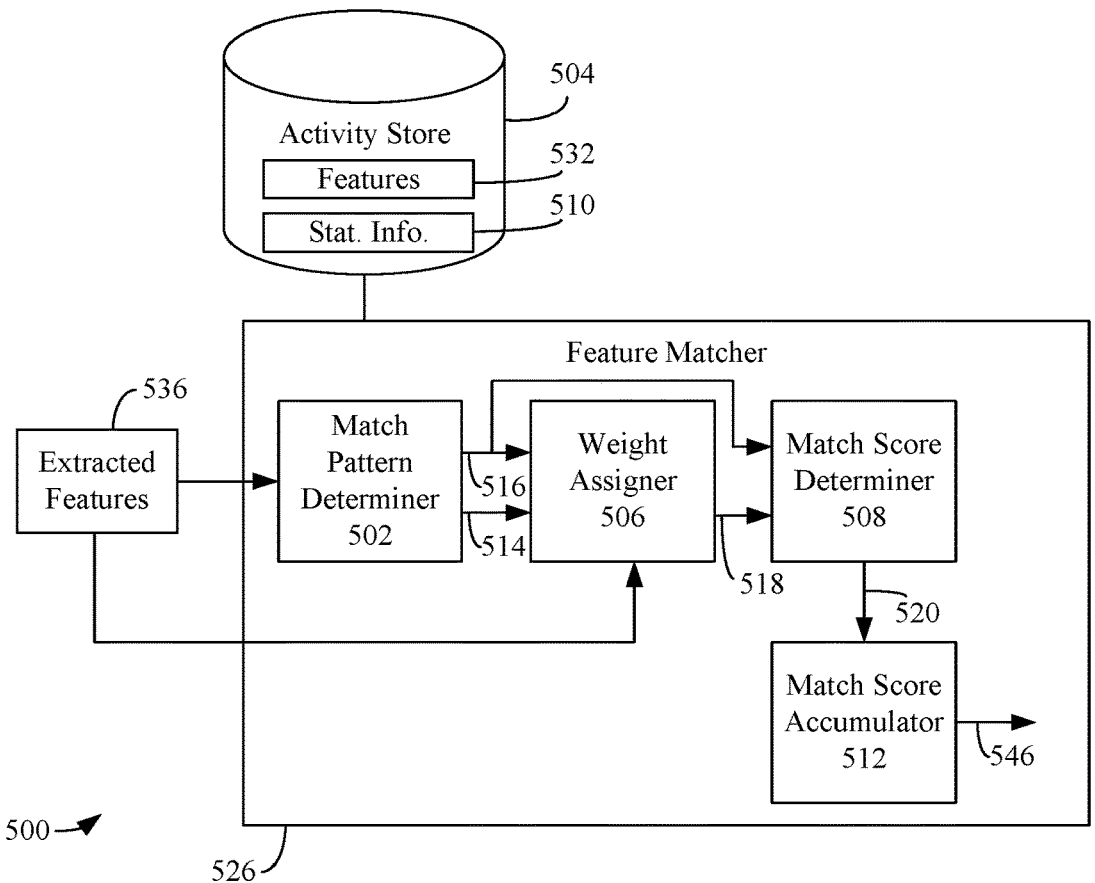
FIG. 5 is a block diagram of a system for determining a match score for a plurality of features, according to an example embodiment.

FIG. 4 shows a flowchart 400 of a method for determining a match score for a plurality of features, according to an example embodiment. In an embodiment, flowchart 400 may be implemented by a feature matcher 526, as shown in FIG. 5. FIG. 5 is a block diagram of a system 500 for determining a match score for a plurality of features, according to an example embodiment. As shown in FIG. 5, system 500 includes an activity store 504 and feature matcher 526. Activity store 504 is an example of activity store 304, as described above with reference to FIG. 3. Activity store 504 and feature matcher 526 may be communicatively coupled via a network (e.g., network 308, as described above with reference to FIG. 3). As also shown in FIG. 5, feature matcher 526 may comprise a match pattern determiner 502, a weight assigner 506, a match score determiner 508, and a match score accumulator 512. Other structural and operational embodiments will be apparent to persons skilled in the relevant art(s) based on the following discussion regarding flowchart 400 and system 500 of FIG. 5.

Flowchart 400 of FIG. 4 begins with step 402. In step 402, for each feature of the plurality of features, a match pattern from a plurality of different match patterns is determined for the feature based on statistical information. For example, with reference to FIG. 5, activity store 504 may store previously-collected features 532 and statistical information 510 associated with features 532. Match pattern determiner 502 may be configured to compare features 536 extracted by feature determiner 324 (as described above with reference to FIG. 3) and determine whether any of features 536 match any of previously-collected features 532. Features 536 and previously-collected features 532 are examples of features 336 and previously-collected features 332, as described above with reference to FIG. 3. If a match is found, match pattern determiner 502 may retrieve statistical information 510 associated with the matched features and determine a match pattern 514 from a plurality of different match patterns for each feature based on statistical information 510. Examples of match patterns include, but are not limited to, a frequent active match pattern, a frequent inactive match pattern, an occasional active match pattern, an occasional inactive match pattern, or a rare match pattern.

In accordance with one or more embodiments, match pattern determiner 502 also determines a weight representative of the strength of the match (shown as strength-based weight 516). For example, the determined strength may be based on how unique the feature type is to individual users (e.g., a device is more unique to users than geographical location) and/or how strong the match is (e.g., a frequent match has more weight than an occasional match). Strength-based weight 516 may be a predetermined value. Strength-based weight 516 may be provided to weight assigner 506 and match score determiner 508.

In accordance with one or more embodiments, the statistical information comprises at least one of a number of times a particular feature of the previously-collected features has been used for authentication for a particular user, a frequency at which a particular feature of the previously-collected features has been used for authentication for a particular user, a standard deviation of the frequency, or a timestamp indicative of the last time a particular feature of the previously-collected features was used for authentication for a particular user. For example, with reference to FIG. 5, statistical information 510 comprises at least one of a number of times a particular feature of previously-collected features 532 has been used for authentication for a particular user, a frequency at which a particular feature of previously-collected features 532 has been used for authentication for a particular user, a standard deviation of the frequency, or a timestamp indicative of the last time a particular feature of previously-collected features 532 was used for authentication for a particular user.

In step 404, for each feature of the plurality of features, a weight is assigned to the feature based on the determined match pattern and a determined strength of the feature. For example, with reference to FIG. 5, weight assigner 506 may assign a weight 518 to each of features 536 based on match pattern 514 and strength-based weight 514. Weight 516 may be provided to match score determiner 508.

In step 406, for each feature of the plurality of features, a match score for the feature is determined based on the assigned weight and the determined strength of the feature. For example, with reference to FIG. 5, match score determiner 508 may determine a match score 520 for each feature based on its assigned weight 518 and strength-based weight 516. Match score determiner 508 may determine a match score for a particular feature in accordance with any of Equations 6-11 (depending on the feature for which match score 520 is determined).

In step 408, a cumulative match score is determined based on the match scores determined for the plurality of features, the cumulative match score being the match score on which the risk level is based. For example, with reference to FIG. 5, match score accumulator 512 may determine a cumulative match score 540 based on match scores 520 determined by match score determiner 508 for each of the plurality of features. Cumulative match score 546 is an example of match score 346, as described above with reference to FIG. 3. Cumulative match score 546 is utilized to determine the risk level of the authentication process, as described above with reference to step 208 of FIG. 2.

Figure 6:
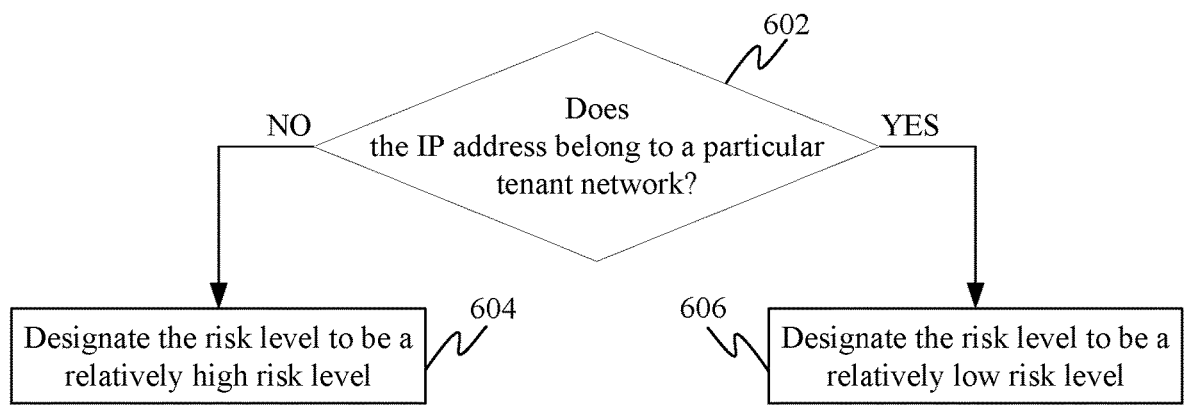
FIG. 6 shows a flowchart of a method for determining a risk level based on whether an IP (Internet Protocol) address from which an authentication protocol was initiated belongs to a tenant network, according to an example embodiment.
Figure 7:
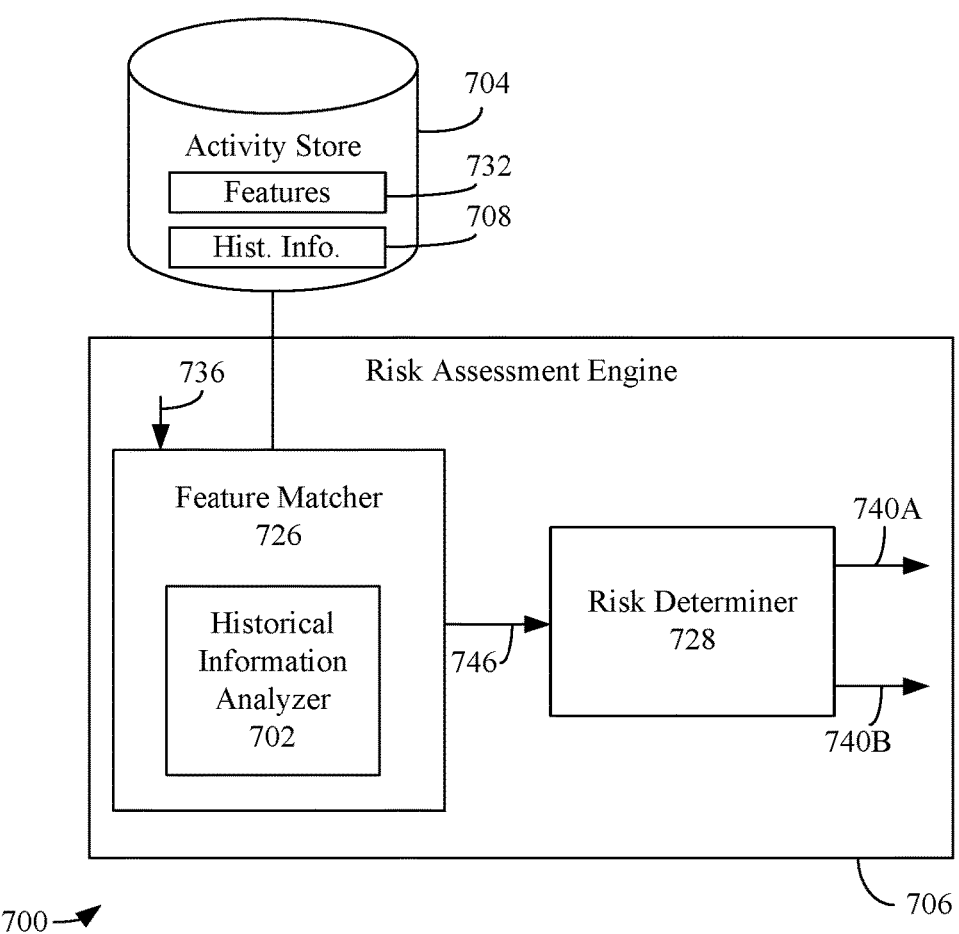
FIG. 7 is a block diagram of a system for determining a risk level based on whether an IP address from which an authentication protocol was initiated belongs to a tenant network, according to an example embodiment.

In accordance with one or more embodiments, the risk level may be determined based on whether the IP address from which the authentication protocol was initiated is belongs to a tenant network. For example, FIG. 6 shows a flowchart 600 of a method for determining a risk level based on whether an IP address from which an authentication protocol was initiated belongs to a tenant network, according to an example embodiment. In an embodiment, flowchart 600 may be implemented by a risk determiner 728, as shown in FIG. 7. FIG. 7 is a block diagram of a system 700 for determining a risk level based on whether an IP address from which an authentication protocol was initiated belongs to a tenant network, according to an example embodiment. As shown in FIG. 7, system 700 includes an activity store 704 and a risk assessment engine 706. Activity store 704 and risk assessment engine 706 are examples of activity store 304 and risk assessment engine 306, as described above with reference to FIG. 3. Risk assessment engine 706 and activity store 704 may be communicatively coupled via a network (e.g., network 308, as described above with reference to FIG. 3). As also shown in FIG. 7, risk assessment engine 706 may comprise a feature matcher 726 and a risk determiner 728. Feature matcher 726 and risk determiner 728 are examples of feature matcher 326 and risk determiner 328, as described above with reference to FIG. 3. As further shown in FIG. 7, feature matcher 726 may comprise a historical information analyzer 702. Other structural and operational embodiments will be apparent to persons skilled in the relevant art(s) based on the following discussion regarding flowchart 600 and system 700 of FIG. 7.

Flowchart 600 of FIG. 6 begins with step 602. In step 602, a determination is made as to whether the IP address belongs to a particular tenant network based on historical information associated with the IP address with respect to the tenant network. For example, with reference to FIG. 7, activity store 704 may store previously-collected features 732 and historical information 708 associated with features 732. The IP address may be a feature (shown as feature 736) extracted from feature determiner 324, as described above with reference to FIG. 3. Feature 736 is an example of features 336, as described above with reference to FIG. 3. Features 732 is an example of features 332, as described above with reference to FIG. 3. A match pattern determiner (e.g., match pattern determiner 502, as described above with reference to FIG. 5) may be configured to compare the IP address to the IP addresses stored via features 732 and determine whether the IP addresses matches any of IP addresses stored in activity store 704. If a match is found, historical information analyzer 702 may retrieve historical information 708 associated with the matched IP address. Examples of historical information 708 include, but are not limited to, the percentage of traffic in the IP address that belongs to the tenant network, the percentage of rate of success of sign-ins in the IP address for the tenant network, the total amount of users from the tenant network that signed in from the subnet, the number of days some tenant's traffic has come from the IP address, the average daily rate of success of sign-ins from the tenant network, the percentage of risky logins via the IP address.

Historical information analyzer 702 may determine whether the IP address belongs to a particular tenant network based on historical information 708 associated with the IP address with respect to the tenant network. If a determination is made that the IP address does not belong to the particular tenant network, flow continues to step 704. Otherwise, flow continues to step 706.

In step 704, the risk level is designated as being a relatively high risk level. For example, feature matcher 736 may provide a match score 746 based on the analysis of historical information 708 in accordance with Equation 11 described above. Because a determination is made that the IP address does not belong to a particular tenant, match score 746 may be relatively low. Accordingly, risk assessor 704 may designate a risk level 740A to be a relatively high risk level. Risk level 740A is an example of risk level 340, as described above with reference to FIG. 3.

In step 706, the risk level is designated as being a relatively low risk level. For example, feature matcher 736 may provide match score 746 based on the analysis of historical information 708 in accordance with Equation 11 described above. Because a determination is made that the IP address belongs to a particular tenant, match score 746 may be relatively high. Accordingly, risk assessor 704 may designate a risk level 740B to be a relatively low risk level. Risk level 740B is an example of risk level 340, as described above with reference to FIG. 3.

III. Example Computer System Implementation

Computing device 102, activity store 104, risk assessment engine 106, resource 110, resource 112, computing device 302, activity store 304, risk assessment engine 306, resource 310, authentication process detector 322, feature determiner 324, feature matcher 326, risk determiner 328, authenticator 330, activity store 504, feature matcher 526, match pattern determiner 502, weight assigner 506, match score determiner 508, match score accumulator 512, risk assessment engine 706, feature matcher 726, risk determiner 728, and historical information analyzer 702 (and/or any of the components described therein), and/or flowcharts 200, 400, and 600, may be implemented in hardware, or hardware combined with one or both of software and/or firmware. For example, computing device 102, activity store 104, risk assessment engine 106, resource 110, resource 112, computing device 302, activity store 304, risk assessment engine 306, resource 310, authentication process detector 322, feature determiner 324, feature matcher 326, risk determiner 328, authenticator 330, activity store 504, feature matcher 526, match pattern determiner 502, weight assigner 506, match score determiner 508, match score accumulator 512, risk assessment engine 706, feature matcher 726, risk determiner 728, and historical information analyzer 702 (and/or any of the components described therein), and/or flowcharts 200, 400, and 600 may be implemented as computer program code/instructions configured to be executed in one or more processors and stored in a computer readable storage medium.

Alternatively, computing device 102, activity store 104, risk assessment engine 106, resource 110, resource 112, computing device 302, activity store 304, risk assessment engine 306, resource 310, authentication process detector 322, feature determiner 324, feature matcher 326, risk determiner 328, authenticator 330, activity store 504, feature matcher 526, match pattern determiner 502, weight assigner 506, match score determiner 508, match score accumulator 512, risk assessment engine 706, feature matcher 726, risk determiner 728, and historical information analyzer 702 (and/or any of the components described therein), and/or flowcharts 200, 400, and 600 may be implemented as hardware logic/electrical circuitry.

For instance, in an embodiment, one or more, in any combination, of computing device 102, activity store 104, risk assessment engine 106, resource 110, resource 112, computing device 302, activity store 304, risk assessment engine 306, resource 310, authentication process detector 322, feature determiner 324, feature matcher 326, risk determiner 328, authenticator 330, activity store 504, feature matcher 526, match pattern determiner 502, weight assigner 506, match score determiner 508, match score accumulator 512, risk assessment engine 706, feature matcher 726, risk determiner 728, and historical information analyzer 702 (and/or any of the components described therein), and/or flowcharts 200, 400, and 600 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
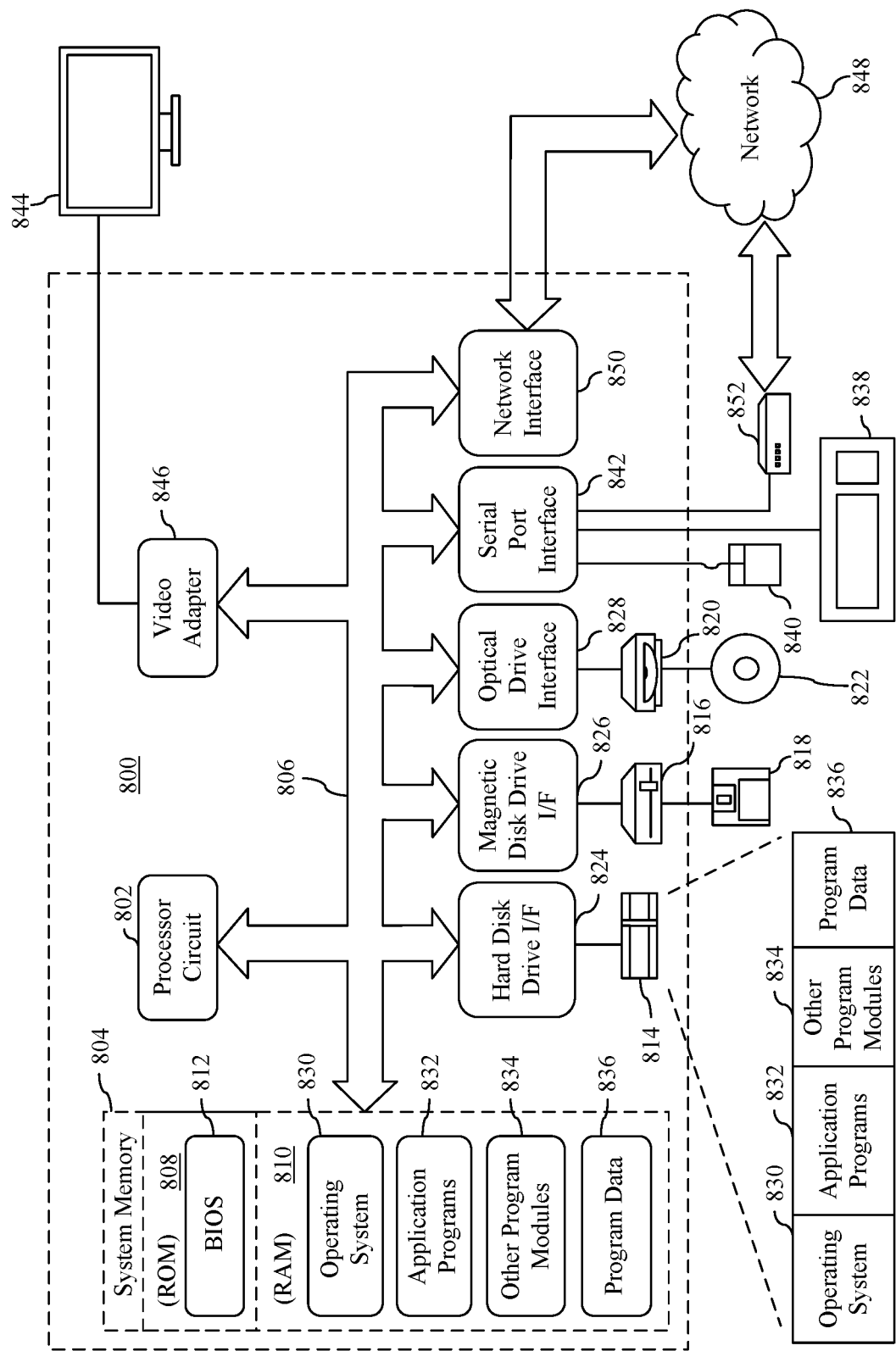
FIG. 8 is a block diagram of an example processor-based computer system that may be used to implement various embodiments.

FIG. 8 depicts an exemplary implementation of a computing device 800 in which embodiments may be implemented. For example, computing device 102, activity store 104, risk assessment engine 106, resource 110, resource 112, computing device 302, activity store 304, risk assessment engine 306, resource 310, authentication process detector 322, feature determiner 324, feature matcher 326, risk determiner 328, authenticator 330, activity store 504, feature matcher 526, match pattern determiner 502, weight assigner 506, match score determiner 508, match score accumulator 512, risk assessment engine 706, feature matcher 726, risk determiner 728, and historical information analyzer 702 (and/or any of the components described therein), and/or flowcharts 200, 400, and 600 may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include computing device 102, activity store 104, risk assessment engine 106, resource 110, resource 112, computing device 302, activity store 304, risk assessment engine 306, resource 310, authentication process detector 322, feature determiner 324, feature matcher 326, risk determiner 328, authenticator 330, activity store 504, feature matcher 526, match pattern determiner 502, weight assigner 506, match score determiner 508, match score accumulator 512, risk assessment engine 706, feature matcher 726, risk determiner 740, and historical information analyzer 702 (and/or any of the components described therein), and/or flowcharts 200, 400, and 600, and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and propagating signals (do not include communication media or propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method is described herein. The method comprises: detecting an authentication process with respect to a resource; determining a plurality of features associated with the authentication process; matching the plurality of features to previously-collected features to determine a match score for the plurality of features; determining a risk level of the authentication process that is indicative of a likelihood that credentials utilized for the authentication process have been compromised based on the match score; and performing an authentication-related action based on the risk level.

In one embodiment of the foregoing method, said performing comprises: preventing access to the resource responsive to the determined risk level being a relatively high risk level.

In one embodiment of the foregoing method, said performing comprises: granting access to the resource responsive to the determined risk level being a relatively low risk level.

In one embodiment of the foregoing method, the features comprise at least one of: an IP address utilized during the authentication process; a device utilized for the authentication process; a tenant IP subnet associated with the authentication process; a browser identifier of a browser utilized during the authentication process; an ASN associated with the authentication process; or a location from which the authentication process was initiated.

In one embodiment of the foregoing method, determining the risk level of the authentication process comprises: determining whether the IP address belongs to a particular tenant network based on historical information associated with the IP address with respect to the tenant network; in response to determining that the IP address belongs to the particular tenant, designating the risk level to be a relatively low risk level; and in response to determining that the IP address does not belong to the particular tenant, designating the risk level to be a relatively high risk level.

In one embodiment of the foregoing method, each of the previously-collected features is associated with statistical information, the statistical information comprising at least one of: a number of times a particular feature of the previously-collected features has been used for authentication for a particular user; a frequency at which a particular feature of the previously-collected features has been used for authentication for a particular user; a standard deviation of the frequency; or a timestamp indicative of the last time a particular feature of the previously-collected features was used for authentication for a particular user.

In one embodiment of the foregoing method, said matching comprises: for each feature of the plurality of features: determining a match pattern from a plurality of different match patterns for the feature based on the statistical information; assigning a weight to the feature based on the determined match pattern and a determined strength of the feature; and determining a match score for the feature based on the assigned weight and the determined strength of the feature; and determining a cumulative match score based on the match scores determined for the plurality of features, the cumulative match score being the match score on which the risk level is based.

A system is also described herein. The system comprises at least one processor circuit; and at least one memory that stores program code configured to be executed by the at least one processor circuit, the program code comprising: an authentication process detector configured to detect an authentication process with respect to a resource; a feature determiner configured to determine a plurality of features associated with the authentication process; a feature matcher configured to match the plurality of features to previously-collected features to determine a match score for the plurality of features; a risk determiner configured to determine a risk level of the authentication process that is indicative of a likelihood that credentials utilized for the authentication process have been compromised based on the match score; and an authenticator configured to perform an authentication-related action based on the risk level.

In one embodiment of the foregoing system, the authenticator is further configured to: prevent access to the resource responsive to the determined risk level being a relatively high risk level.

In one embodiment of the foregoing system, the authenticator is further configured to: grant access to the resource responsive to the determined risk level being a relatively low risk level.

In one embodiment of the foregoing system, the features comprise at least one of: an IP address utilized during the authentication process; a device utilized for the authentication process; a tenant IP subnet associated with the authentication process; a browser identifier of a browser utilized during the authentication process; an ASN associated with the authentication process; or a location from which the authentication process was initiated.

In one embodiment of the foregoing system, the risk determiner is further configured to: determine whether the IP address belongs to a particular tenant network based on historical information associated with the IP address with respect to the tenant network; in response to determining that the IP address belongs to the particular tenant, designate the risk level to be a relatively low risk level; and in response to determining that the IP address does not belong to the particular tenant, designate the risk level to be a relatively high risk level.

In one embodiment of the foregoing system, each of the previously-collected features is associated with statistical information, the statistical information comprising at least one of: a number of times a particular feature of the previously-collected features has been used for authentication for a particular user; a frequency at which a particular feature of the previously-collected features has been used for authentication for a particular user; a standard deviation of the frequency; or a timestamp indicative of the last time a particular feature of the previously-collected features was used for authentication for a particular user.

In one embodiment of the foregoing system, the feature matcher is further configured to: for each feature of the plurality of features: determine a match pattern from a plurality of different match patterns for the feature based on the statistical information; assign a weight to the feature based on the determined match pattern and a determined strength of the feature; and determine a match score for the feature based on the assigned weight and the determined strength of the feature; and determine a cumulative match score based on the match scores determined for the plurality of features, the cumulative match score being the match score on which the risk level is based.

A computer-readable storage medium having program instructions recorded thereon that, when executed by at least one processor of a computing device, perform a method, is also described herein. The method comprises: detecting an authentication process with respect to a resource; determining a plurality of features associated with the authentication process; matching the plurality of features to previously-collected features to determine a match score for the plurality of features; determining a risk level of the authentication process that is indicative of a likelihood that credentials utilized for the authentication process have been compromised based on the match score; and performing an authentication-related action based on the risk level.

In one embodiment of the foregoing computer-readable storage medium, said performing comprises: preventing access to the resource responsive to the determined risk level being a relatively high risk level.

In one embodiment of the foregoing computer-readable storage medium, said performing comprises: granting access to the resource responsive to the determined risk level being a relatively low risk level.

In one embodiment of the foregoing computer-readable storage medium, the features comprise at least one of: an IP address utilized during the authentication process; a device utilized for the authentication process; a tenant IP subnet associated with the authentication process; a browser identifier of a browser utilized during the authentication process; or a location from which the authentication process was initiated.

In one embodiment of the foregoing computer-readable storage medium, determining the risk level of the authentication process comprises: determining whether the IP address belongs to a particular tenant network based on historical information associated with the IP address with respect to the tenant network; in response to determining that the IP address belongs to the particular tenant, designating the risk level to be a relatively low risk level; and in response to determining that the IP address does not belong to the particular tenant, designating the risk level to be a relatively high risk level.

In one embodiment of the foregoing computer-readable storage medium, each of the previously-collected features is associated with statistical information, the statistical information comprising at least one of: a number of times a particular feature of the previously-collected features has been used for authentication for a particular user; a frequency at which a particular feature of the previously-collected features has been used for authentication for a particular user; a standard deviation of the frequency; or a timestamp indicative of the last time a particular feature of the previously-collected features was used for authentication for a particular user.

In one embodiment of the foregoing computer-readable storage medium, said matching comprises: for each feature of the plurality of features: determining a match pattern from a plurality of different match patterns for the feature based on the statistical information; assigning a weight to the feature based on the determined match pattern and a determined strength of the feature; and determining a match score for the feature based on the assigned weight and the determined strength of the feature; and determining a cumulative match score based on the match scores determined for the plurality of features, the cumulative match score being the match score on which the risk level is based.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
    detecting an authentication process with respect to a resource;
    determining a plurality of features associated with the authentication process;
    matching the plurality of features to previously-collected features to determine a match score for the plurality of features, the match score being based on a plurality of match patterns each associated with a respective feature of the plurality of features and each being indicative of a frequency and recency at which the resource was accessed with respect to the respective feature;
    determining a risk level of the authentication process that is indicative of a likelihood that credentials utilized for the authentication process have been compromised based on the match score; and
    performing an authentication-related action based on the risk level.

2. The method of claim 1, wherein said performing comprises:
    preventing access to the resource responsive to the determined risk level being a relatively high risk level.

3. The method of claim 1, wherein said performing comprises:
    granting access to the resource responsive to the determined risk level being a relatively low risk level.

4. The method of claim 1, wherein the features comprise at least one of:
    an IP address utilized during the authentication process;
    a device utilized for the authentication process;
    a tenant IP subnet associated with the authentication process;
    a browser identifier of a browser utilized during the authentication process;
    an ASN associated with the authentication process; or
    a location from which the authentication process was initiated.

5. The method of claim 4, wherein determining the risk level of the authentication process comprises:
    determining whether the IP address belongs to a particular tenant network based on historical information associated with the IP address with respect to the tenant network;
    in response to determining that the IP address belongs to the particular tenant, designating the risk level to be a relatively low risk level; and
    in response to determining that the IP address does not belong to the particular tenant, designating the risk level to be a relatively high risk level.

6. The method of claim 1, wherein each of the previously-collected features is associated with statistical information, the statistical information comprising at least one of:
    a number of times a particular feature of the previously-collected features has been used for authentication for a particular user;
    a frequency at which a particular feature of the previously-collected features has been used for authentication for a particular user;
    a standard deviation of the frequency; or
    a timestamp indicative of the last time a particular feature of the previously-collected features was used for authentication for a particular user.

7. The method of claim 6, wherein said matching comprises:
    for each feature of the plurality of features:

determining a match pattern from a plurality of different match patterns for the feature based on the statistical information;
assigning a weight to the feature based on the determined match pattern and a determined strength of the feature; and
determining a match score for the feature based on the assigned weight and the determined strength of the feature; and
determining a cumulative match score based on the match scores determined for the plurality of features, the cumulative match score being the match score on which the risk level is based.

8. A system, comprising:
at least one processor circuit; and
at least one memory that stores program code configured to be executed by the at least one processor circuit, the program code comprising:
an authentication process detector configured to detect an authentication process with respect to a resource;
a feature determiner configured to determine a plurality of features associated with the authentication process;
a feature matcher configured to match the plurality of features to previously-collected features to determine a match score for the plurality of features, the match score being based on a plurality of match patterns each associated with a respective feature of the plurality of features and each being indicative of a frequency and recency at which the resource was accessed with respect to the respective feature;
a risk determiner configured to determine a risk level of the authentication process that is indicative of a likelihood that credentials utilized for the authentication process have been compromised based on the match score; and
an authenticator configured to perform an authentication-related action based on the risk level.

9. The system of claim 8, wherein the authenticator is further configured to:
prevent access to the resource responsive to the determined risk level being a relatively high risk level.

10. The system of claim 8, wherein the authenticator is further configured to:
grant access to the resource responsive to the determined risk level being a relatively low risk level.

11. The system of claim 8, wherein the features comprise at least one of:
an IP address utilized during the authentication process;
a device utilized for the authentication process;
a tenant IP subnet associated with the authentication process;
a browser identifier of a browser utilized during the authentication process;
an ASN associated with the authentication process; or
a location from which the authentication process was initiated.

12. The system of claim 11, wherein the risk determiner is further configured to:
determine whether the IP address belongs to a particular tenant network based on historical information associated with the IP address with respect to the tenant network;
in response to determining that the IP address belongs to the particular tenant, designate the risk level to be a relatively low risk level; and
in response to determining that the IP address does not belong to the particular tenant, designate the risk level to be a relatively high risk level.

13. The system of claim 8, wherein each of the previously-collected features is associated with statistical information, the statistical information comprising at least one of:
a number of times a particular feature of the previously-collected features has been used for authentication for a particular user;
a frequency at which a particular feature of the previously-collected features has been used for authentication for a particular user;
a standard deviation of the frequency; or
a timestamp indicative of the last time a particular feature of the previously-collected features was used for authentication for a particular user.

14. The system of claim 13, wherein the feature matcher is further configured to:
for each feature of the plurality of features:
determine a match pattern from a plurality of different match patterns for the feature based on the statistical information;
assign a weight to the feature based on the determined match pattern and a determined strength of the feature; and
determine a match score for the feature based on the assigned weight and the determined strength of the feature; and
determine a cumulative match score based on the match scores determined for the plurality of features, the cumulative match score being the match score on which the risk level is based.

15. A computer-readable storage medium having program instructions recorded thereon that, when executed by at least one processor device of a computing device, perform a method, the method comprising:
detecting an authentication process with respect to a resource;
determining a plurality of features associated with the authentication process;
matching the plurality of features to previously-collected features to determine a match score for the plurality of features, the match score being based on a plurality of match patterns each associated with a respective feature of the plurality of features and each being indicative of a frequency and recency at which the resource was accessed with respect to the respective feature;
determining a risk level of the authentication process that is indicative of a likelihood that credentials utilized for the authentication process have been compromised based on the match score; and
performing an authentication-related action based on the risk level.

16. The computer-readable storage medium of claim 15, wherein said performing comprises:
preventing access to the resource responsive to the determined risk level being a relatively high risk level.

17. The computer-readable storage medium of claim 15, wherein said performing comprises:
granting access to the resource responsive to the determined risk level being a relatively low risk level.

18. The computer-readable storage medium of claim 15, wherein the features comprise at least one of:
an IP address utilized during the authentication process;
a device utilized for the authentication process;
a tenant IP subnet associated with the authentication process;

a browser identifier of a browser utilized during the authentication process;

an ASN associated with the authentication process; or a location from which the authentication process was initiated.

19. The computer-readable storage medium of claim 18, wherein determining the risk level of the authentication process comprises:

determining whether the IP address belongs to a particular tenant network based on historical information associated with the IP address with respect to the tenant network;

in response to determining that the IP address belongs to the particular tenant, designating the risk level to be a relatively low risk level; and in response to determining that the IP address does not belong to the particular tenant, designating the risk level to be a relatively high risk level.

20. The computer-readable storage medium of claim 15, wherein each of the previously-collected features is associated with statistical information, the statistical information comprising at least one of:

a number of times a particular feature of the previously-collected features has been used for authentication for a particular user;

a frequency at which a particular feature of the previously-collected features has been used for authentication for a particular user;

a standard deviation of the frequency; or a timestamp indicative of the last time a particular feature of the previously-collected features was used for authentication for a particular user.

\* \* \* \* \*